UNITED STATES PATENT OFFICE.

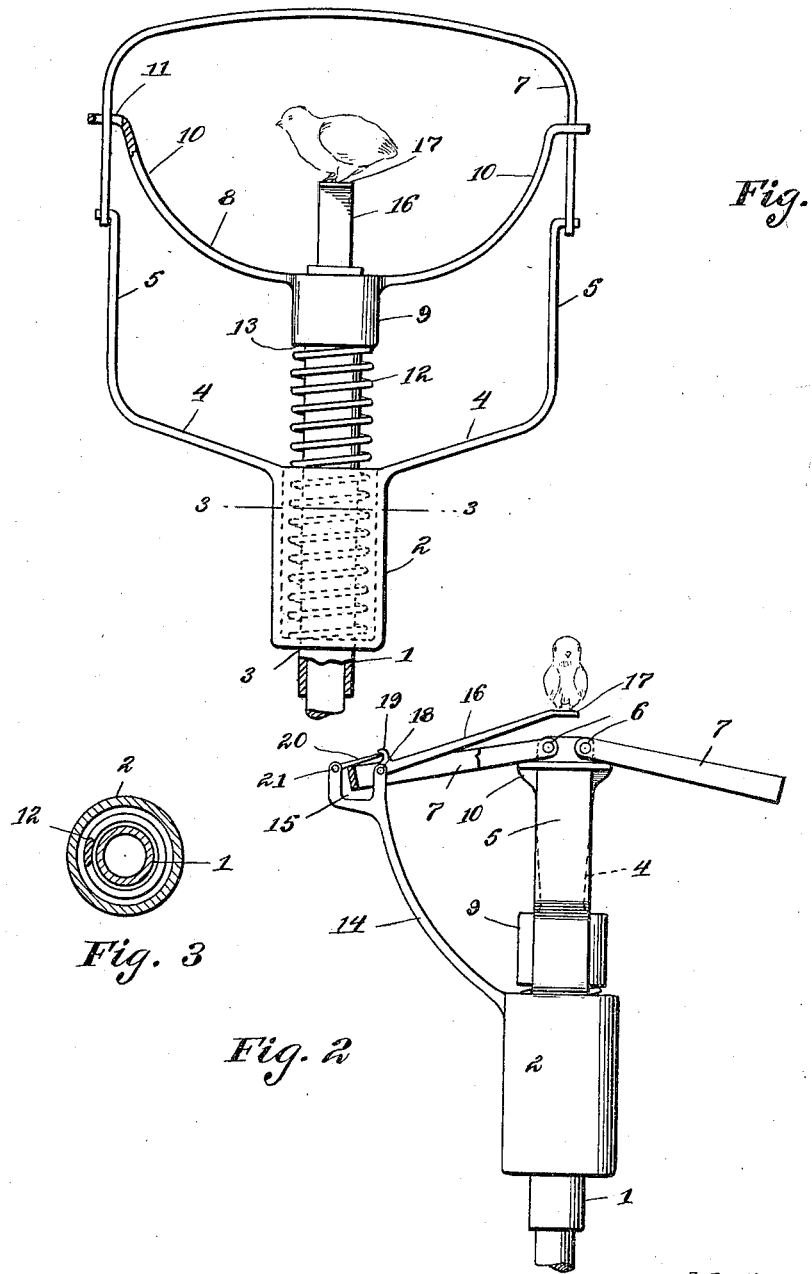

WALTER E. WALKER, OF GARDEN PLAIN, ALBERTA, CANADA.

BIRD-TRAP.

1,310,266.     Specification of Letters Patent.     Patented July 15, 1919.

Application filed November 17, 1917, Serial No. 202,541. Renewed December 18, 1918. Serial No. 267,408.

*To all whom it may concern:*

Be it known that I, WALTER E. WALKER, a citizen of Canada, residing at Garden Plain, in the Province of Alberta and country of Canada, have invented new and useful Improvements in Bird-Traps, of which the following is a specification.

This invention is an improved trap for catching hawks and other birds the object of the invention being to provide an improved trap of this kind which is simple in construction, which is adapted to be used on the upper end of an upright pole or stake set in the ground and which embodies a trigger which forms a perch to induce a bird to alight thereon and also embodies a pair of spring actuated jaws to catch and hold the bird by the legs when the jaws are released by the trigger perch.

The invention consists in the construction, combination and arrangement of devices hereinafter described and claimed.

In the accompanying drawings:—

Figure 1 is an elevation, partly in section, of my improved bird trap, showing the same set.

Fig. 2 is a similar view at right-angles to Fig. 1 and partly in section.

Fig. 3 is a detail sectional view on the plane indicated by the line 3—3 of Fig. 1.

In the embodiment of my invention I provide an inner tube 1 which in practice may be made of sheet metal and which is adapted to receive the upper end of a pole or stake, set in the ground or secured to a building or the like, to support the trap in an elevated position. An outer tube 2 is arranged at the lower end of the inner tube in spaced relation and concentrically with respect thereto and is secured at its lower end to the lower end of the inner tube as at 3. A pair of upwardly diverging arms 4 have their lower ends secured to the outer tube, their upper ends 5 being vertical as shown and being each provided with a pair of pivot studs 6. A pair of jaws 7 have their ends provided with openings which receive the pivot studs, so that the jaws are pivotally connected at their ends to the upper ends of the arms 4 and are adapted thereby to be opened and closed.

A yoke 8 is also provided to operate the jaws and comprises a sleeve 9 which is vertically slidably mounted on the inner tube and a pair of upwardly diverging arms 10, each of said arms having an opening 11 near its outer end through which the sides of the jaws pass, so that the yoke arms are slidably connected to the jaws. The openings 11 are of such size as to clear the upper ends 5 of the arms 4. A coiled extensile spring 12 is arranged on the inner tube, with its lower portion between the inner and outer tubes and with its upper end bearing under the shoulder 13 of the sleeve 9, the tension of the spring serving to move the yoke upwardly and thereby cause its arms 10 to close the jaws when one of the latter is released.

An arm 14 is arranged at right-angles to the arms 4 and has its lower end secured to the outer tube and its upper end spaced a suitable distance from the inner tube and formed with a fork 15, the said fork being adapted to receive one of the jaws, when the jaws are open and the trap set, as shown in full lines in Fig. 2. A trigger 16 which is provided at one end with a perch 17 has the opposite end pivotally connected to one side of the fork as at 18 and is provided near said pivoted end with a lip 19. A dog 20 is pivotally connected as at 21 to the opposite side of the fork and is arranged across the said jaw when the trap is set, the free end of the dog being arranged under the lip 19 of the trigger perch and hence, owing to the tension of the spring serving to hold the trigger perch in set position. A suitable bait may, if necessary, be attached to the trigger perch. When a hawk or other bird alights on the trigger perch its weight depresses the trigger perch, causing the lip 19 to disengage the dog and thereupon the jaws are released and the spring moves the yoke upwardly and causes the jaws to close, as will be readily understood, and to catch and hold the bird by the legs.

While I have herein shown and described a preferred form of my invention, I would have it understood that changes may be made in the form, proportion and construction of the several parts without departing from the spirit of the invention and within the scope of the appended claim.

Having thus described my invention, I claim:

A bird trap comprising an upright member for attachment to the upper end of a pole or the like, a yoke having a sleeve slidable vertically on said member and also having a pair of upwardly diverging arms each provided with an opening, a pair of upwardly diverging arms carried by the said member, a pair of jaws having their ends pivotally connected to the upper ends of said arms, said jaws being so arranged as to pass through the openings of the yoke arms when the yoke is raised, a spring to move the yoke upwardly and cause the same to close the jaws, a third arm carried by said member and having a fork at its upper end, a trigger element pivotally connected to one side of the fork and provided with a detent lip, the said fork being adapted to receive one of the jaws when the jaws are open, and a dog pivotally connected at one end to the opposite side of the fork, the dog being adapted to pass over and engage said jaw and to also engage under the lip of the trigger element.

In testimony whereof I affix my signature.

WALTER E. WALKER.

Copies of this patent may be obtained for five cents each, by addressing the "Commissioner of Patents, Washington, D. C."